April 5, 1932.  R. A. BROWN  1,852,145
OCEAN SWELL MOTOR
Filed May 17, 1930   3 Sheets-Sheet 1

Inventor
ROBERT A. BROWN
By Martin P. Smith
Attorney

April 5, 1932.  R. A. BROWN  1,852,145
OCEAN SWELL MOTOR
Filed May 17, 1930  3 Sheets-Sheet 2

Inventor
ROBERT A. BROWN
By Martin P. Smith
Attorney

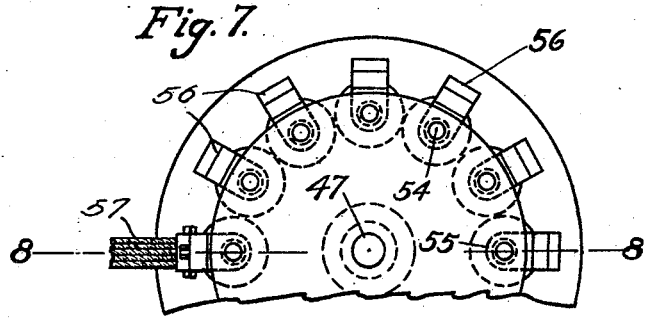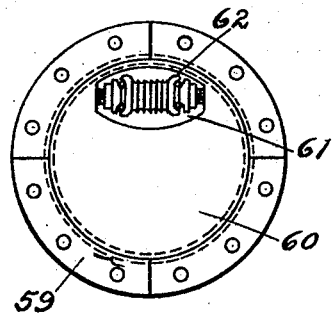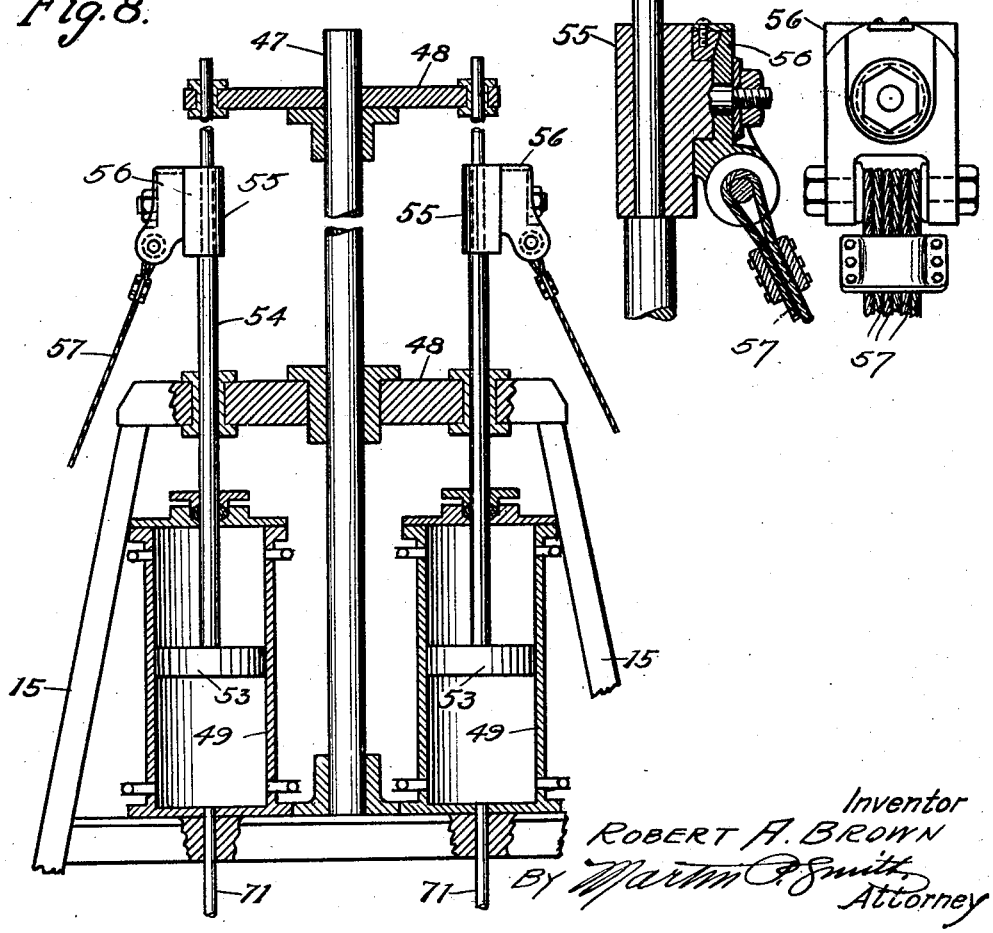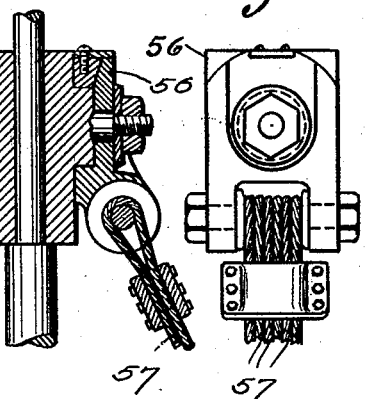

Patented Apr. 5, 1932

1,852,145

UNITED STATES PATENT OFFICE

ROBERT A. BROWN, OF LOS ANGELES, CALIFORNIA

OCEAN SWELL MOTOR

Application filed May 17, 1930. Serial No. 453,222.

My invention relates generally to power production apparatus and more particularly to an ocean swell motor and has for its principal object, the provision of a relatively simple, practical and efficient structure that is designed to float on the surface of the ocean or sea and which will be highly effective in utilizing the swells that continuously occur on the surface of the water, for the development of power, in the form of compressed air that is confined in large storage tanks forming a part of the floating structure or which may be located on the shore adjacent to said structure.

Further objects of my invention are, to provide an ocean swell motor having a pair of separately formed buoyant structures, one disposed within the other and the two structures arranged for separate movement as a result of swells and waves on the surface of the ocean, further, to arrange within the two separate structures relatively large storage tanks that receive compressed air from suitably located air compressors that are actuated by the variable movement between the two buoyant structures, further, to provide connections between the two main structures and the air compressors so that the latter are actuated as a result of any relative movement, either vertical or lateral, between the two main structures and further, to provide fluid pressure cushioning means, between the two main structures so as to yieldingly resist any sudden movements of the buoyant members that may result from high waves developed during storms and which otherwise might tend to injure the main parts of the motor, or render parts thereof inoperative.

With the foregoing and other objects in view, my invention consists in certain novel features of construction and arrangement of parts that will hereinafter be more fully described and claimed and illustrated in the accompanying drawings, in which:

Fig. 7 is a top plan view of the central portion of the inner one of the two main members of the motor.

Fig. 8 is an enlarged vertical section taken on the line 8—8 of Fig. 7.

Fig. 9 is a top plan view of a cable guide that is utilized in the upper portion of the outer main member of the motor.

Fig. 10 is a vertical section of a swiveled connection between the cables and the piston rods of the air compressors that are arranged in the upper portion of the inner one of the main members.

Fig. 11 is a front elevational view of the swiveled connection illustrated in Fig. 10.

Figure 1:
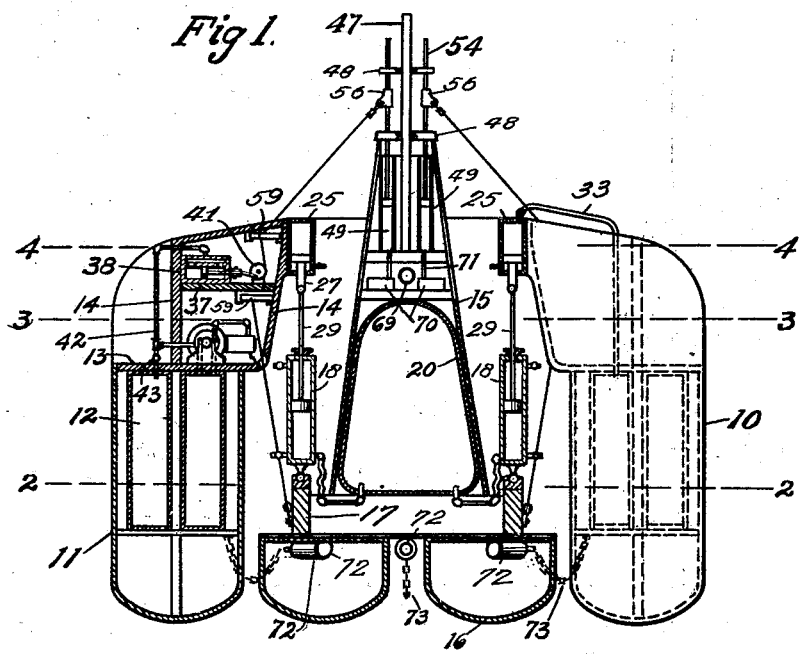
Fig. 1 is a vertical section taken through the center of an ocean swell motor constructed in accordance with my invention.

Referring by numerals to the accompanying drawings which illustrate a practical embodiment of my invention, 10 designates generally the framework of the outer buoyant member of the motor, said frame work being preferably constructed from structural steel and substantially circular in plan view and arranged within the outer portion of said frame work is a plurality of vertically disposed tanks 11, preferably constructed of heavy sheet metal and having rounded lower end portions.

I prefer to provide three of these tanks 11 and to arrange the same approximately 120° apart in the frame work. The lower portions of these tanks rest on the water thereby serving to buoy the outer main member of the motor.

Arranged within each tank or buoyant member 11 is a plurality of compressed air storage tanks 12 and secured in the frame work directly above these storage tanks is a circular platform or floor 13 and supported thereby and extending upwardly therefrom is a suitable superstructure 14 that is preferably formed of structural steel and which forms the upper portion of the outer main member of the motor.

Figure 2:
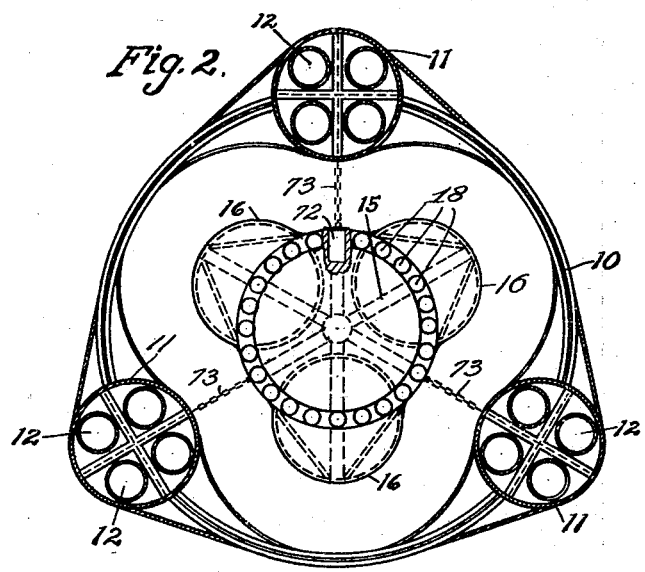
Fig. 2 is a horizontal section taken approximately on the line 2—2 of Fig. 1.
Figure 3:
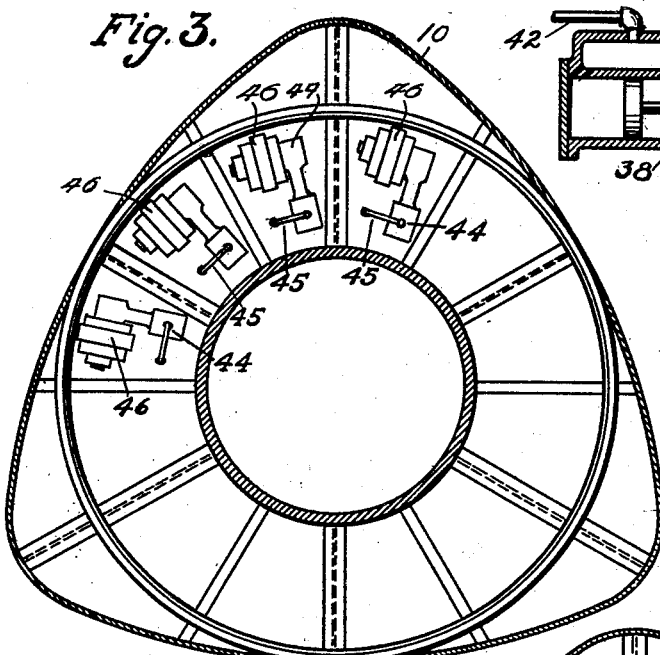
Fig. 3 is a horizontal section taken approximately on the line 3—3 of Fig. 1.
Figure 5:
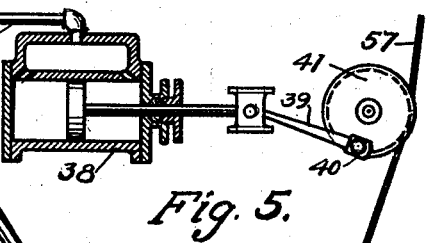
Fig. 5 is a detail elevational view partly in section of one of the air compressors that are arranged in the upper portion of the outer buoyant members.
Figure 6:
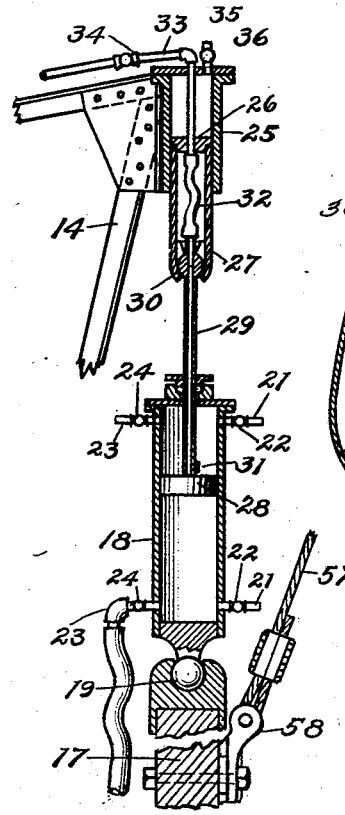
Fig. 6 is an enlarged vertical section of one of the air pumps that is arranged between the inner and outer main members of the motor.
Figure 4:
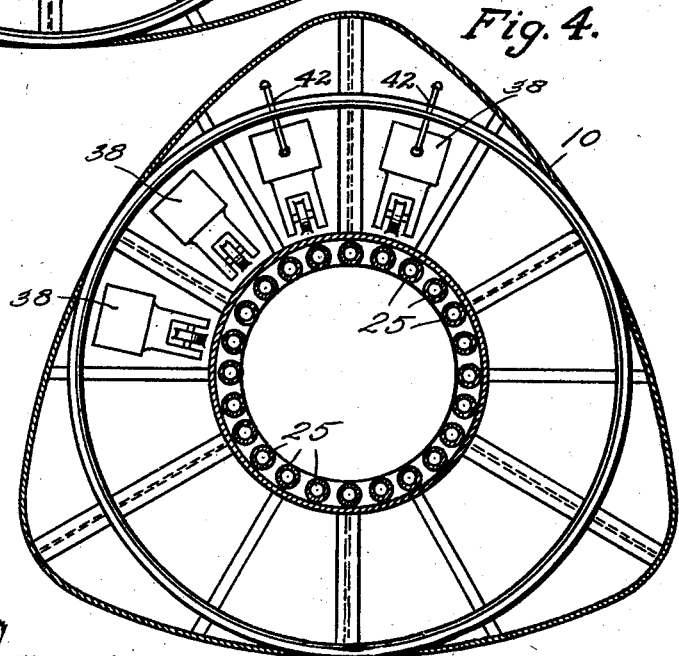
Fig. 4 is a horizontal section taken approximately on the line 4—4 of Fig. 1.

Arranged within frame 10 is a substantially triangular skeleton mast structure 15 that is secured to, and supported by, a plurality of tanks 16 that are adapted to rest on the surface of the water and in order that the inner member of the motor comprising the tanks 16 and mast 15 may move laterally relative to the outer buoyant member, I prefer to utilize three tanks 16 and to arrange the same 120° apart and further, to position the inner member so that the tanks 16 are positioned between the tanks 11, as illustrated in Fig. 2, thus the inner and outer buoyant members of the motor may move freely in all directions for a limited distance relative to each other.

Mounted on top of the tanks 16 is a truss 17 and supported thereby is a plurality of vertically disposed air compressing cylinders 18. The lower ends of these cylinders are supported on truss 17 by ball and socket joints 19.

Arranged within the lower portion of the mast 15, that is supported by the buoyant members 16 is a compressed air storage tank 20 and leading from the ends of the cylinders 18 to said storage tank are pipes 21 in which are located check valves 22.

Leading into the upper and lower ends of the cylinders 18 are air inlet pipes 23 in which are located inlet check valves 24.

Secured to the superstructure 14, directly above the cylinders 18 are short cylinders 25, within which are arranged for sliding movement, pistons 26 having depending tubular piston rods 27.

Arranged for operation within the cylinders 18 are pistons 28 having tubular piston rods 29, the upper ends of which are connected by ball and socket joints 30 with the lower ends of the tubular piston rods 27. Formed through the lower portion of piston rod 29 and communicating with the chamber in the cylinder 18 above piston 28 is a port 31. The upper end of each tubular piston rod 29 is connected by a flexible tube 32 to the lower end of a pipe 33 that extends upwardly through piston 26 and cylinder 25 and said tube 33 leads to one or more of the compressed air storage tanks 12. Each tube 33 is provided with a check valve 34.

Leading into the upper end of cylinder 25 is an air inlet and outlet tube 35 in which is located an adjustable inlet and outlet air flow control valve 36.

Each cylinder 25 and its piston 26 constitutes an air cushion for the piston 28 in the corresponding pump cylinder 18 and said air cushion yieldingly resists any sudden upward movement of the piston and cylinder that is mounted on the inner one of the buoyant members. A portion of the air that is compressed in cylinder 18 above the piston 28 will pass through port 31 upwardly through tubular piston rod 29 through flexible tube 32 and thence through pipe 33 to one of the storage tanks 12. Thus the cylinder 18 and its piston 28 functions as a double acting pump to compress air and the structure including the cylinder 25 and its piston 26 functions as a combined air compressor and cushion.

Located in the upper portion of the superstructure 14, upon a suitable support 37, are double acting air compressors 38 and the piston rods of these compressors are connected by pitmen 39, to wrist pins 40 that project from the side faces of grooved drums 41 and which latter are journaled in suitable bearings on the support 37.

Leading from the cylinders 38 of the air compressors, to the compressed air storage tanks 12, are pipes 42 in which are located, suitable check valves 43.

Located on the floor or platform 13, are motors or turbines 44 that are actuated by compressed air taken from the storage tanks 12, through pipes 45 and associated with each compressed air motor or turbine is an electric generator 46 and which generators are utilized for converting the relative motion between the two main parts of the motor, into electric energy.

Current from the generators may be led through suitably insulated and sheathed conductors to storage plants or electric transmission lines.

Projecting upwardly from the central portion of mast 15 is a post 47 that supports suitable frame work 48 and arranged in the lower portion of this frame work is a plurality of air cushion cylinders 49 within which are arranged pistons 53 and projecting upwardly from the latter through suitable bearings on the frame work 48 are piston rods 54. (See Fig. 8.)

Secured on the upper portions of these piston rods, are blocks 55 and pivotally mounted on the outer faces of said blocks are depending brackets 56. Secured to the lower portions of these pivoted brackets are the upper ends of cables 57 which pass downwardly around the grooved drums 41 and thence downwardly and the lower ends of said cables are secured to blocks 58 that are pivotally connected to the truss 17.

As a result of the construction just described any relative vertical or lateral movement between the two main members of the motor will, as a result of the cables passing around the grooved pulleys 41, rotate said pulleys, thereby imparting reciprocating motion to the piston rods of the double acting air compressors 38 and thereby pump air into tanks 12.

Directly above and below each grooved pulley 41 are ring bearings 59 and arranged for rotation therein on suitable anti-friction bearings are discs 60.

A portion of each disc 60 to the side of the center thereof is cut away to provide an opening 61 and journaled in said opening is a grooved drum 62 that serves as a bearing for the cables that engage the corresponding grooved drum 41.

By mounting the discs 60 so that they will rotate in their bearings the grooved rollers 62 may readily yield to all strains impressed thereupon by the cables.

Arranged in the frame 48, just above compressed air tank 20, is a motor 69 which may be an electric motor that receives current from one of the generators 46, or it may be a compressed air motor and this motor operates one or more pumps 70 that are provided with connections 71 leading to the lower ends of the cylinders 49. These pumps may be operated from time to time to maintain a predetermined degree of air pressure in the cylinders 49 below the pistons 53 so as to exert sufficient upward pressure on the piston rods 54 to maintain the cables at all times in taut condition and which condition is essential to the successful operation of the cables in their connection with the grooved drums 41.

Suitably mounted on the truss 17 is a plurality of air cushion cylinders 72, the pistons of which are connected by chains 73 to the lower portion of the structure that supports the tanks 11.

In the operation of my improved ocean swell motor, the structure is suitably anchored so that it floats on the surface of the ocean or sea and the swells and waves on the surface of the water continuously impart relative movement between the outer and inner members of the structure and all of these relative movements either vertically, laterally or in inclined planes are utilized for the production of power.

The two main members of the apparatus may shift their positions laterally in all directions relative to each other for a limited distance and such movements are yieldingly resisted and limited by the air cushions formed by the cylinders 72 that are mounted on the inner member and the pistons of which are connected by the chains 73 to the lower portions of frame 10. Lateral movement between the upper portions of the main members of the structures is limited and controlled and yieldingly resisted by the connection between cables 57 and cable guides 62, which latter are mounted on the outer main member and the ends of the cables being connected to the upper and lower portion of the inner main member.

Relative vertical movement between the two main members will actuate pistons 26 within the cylinders 25, thereby cushioning the upward movement of the inner member or the downward movement of the outer member and a portion of the air compressed by pistons 28 on their upward strokes will pass through the tubular piston rods 29 flexible connections 32 and ducts 33 that lead to tanks 12.

The greater portion of the air compressed within cylinders 18 will discharge through pipes 21 directly into tank 20.

Any and all vertical, lateral and inclined movement of the inner member relative to the outer member and vice versa will, through cables 57, effect rotation of the grooved drums 41, thereby actuating the pistons within the double acting air pumps 38 and air compressed thereby will be delivered through ducts 42 to the tanks 12.

Compressed air from the different storage tanks may be taken to the compressed air motors or turbines 44 and the latter drive the generators 46 to generate electric current which may be distributed through transmission lines to the points of use.

If desired suitable storage tanks may be located on the shore adjacent to where the motor is anchored and where such arrangement is provided compressed air from the various pumps is taken to the storage tanks through suitable ducts which may be wholly or partly flexible.

A desirable feature of my invention is a substantially triangular form of the two main buoyant members of the motor and which particular form results from the location of the tanks 11 and the tanks 16 approximately 120° apart and the position of the central member so that the tanks 16 are in staggered relation to the tanks 11. This particular arrangement permits the two main members to move toward and away from each other for a considerable distance and this relative movement is highly effective in the transmission of swell and wave power to the connections that operate the various air compressors.

Obviously the air cushions for limiting the relative movement of the two main members toward and away from each other and the connections between said air cushions and said members must be arranged so as to prevent the members from making contact with each other even under extreme conditions.

Thus it will be seen that I have provided a power generating apparatus that is designed to float on the surface of the ocean or sea and which will convert the motion of the swells and waves on the surface of the water, into power in the form of compressed air or electric current.

The apparatus includes two main structures, that are mounted for independent relative movement in all directions and the two main members are connected so that all relative movement between said members is utilized for the production of power. Inasmuch as the power generator is buoyant, it may be readily towed to and from points of use and said apparatus may be advantageously employed for the economical production of power.

It will be understood that minor changes in the size, form and construction of the various parts of my improved ocean swell motor may be made and substituted for those herein shown and described without departing from the spirit of my invention, the scope of which is set forth in the appended claims.

I claim as my invention:

1. In an ocean swell motor, a pair of separate buoyant members, one entirely surrounding the other, the inner buoyant member including a plurality of separate tanks, a mast structure surrounding said tanks, air cushions arranged in the upper portion of said mast structure, connections between the outer buoyant member and said air cushions, air storage tanks on said buoyant members and air compressors arranged between said members and actuated by relative movement thereof for compressing air and delivering same to said storage tanks.

2. In an ocean swell motor, a pair of separate buoyant members, one entirely surrounding the other, the inner buoyant member including a plurality of separate tanks, a mast structure surrounding said tanks, air cushions arranged in the upper portion of said mast structure, connections between the outer buoyant member and said air cushions, air storage tanks on said buoyant members, air compressors arranged between said members and actuated by relative movement thereof for compressing air and delivering same to said storage tanks and air cushions arranged between said members for yieldingly resisting and limiting the movement of said members toward and away from each other.

3. In an ocean swell motor, a pair of separate buoyant members, one entirely surrounding the other, the inner buoyant member including a plurality of separate tanks, a mast structure surrounding said tanks, air cushions arranged in the upper portion of said mast structure, connections between the outer buoyant member and said air cushions, compressed air storage tanks on said members and air compressors arranged between said members and actuated by relative vertical movement thereof for compressing air and delivering same into said storage tanks.

4. In an ocean swell motor, a pair of separate buoyant members, one entirely surrounding the other, the inner buoyant member including a plurality of separate tanks, a mast structure surrounding said tanks, air cushions arranged in the upper portion of said mast structure, connections between the outer buoyant member and said air cushions, compressed air storage tanks on said members, air compressors arranged between said members and actuated by relative vertical movement thereof for compressing air and delivering same into said storage tanks and means for yieldingly resisting and limiting the relative vertical movement of said buoyant members.

5. In an ocean swell motor, a pair of separate buoyant members, one member entirely surrounding the other, the inner buoyant member including a plurality of separate tanks, a mast structure surrounding said tanks, air cushions arranged in the upper portion of said mast structure, connections between the outer buoyant member and said air cushions, compressed air storage carried by said members, air compressors arranged on one of said members, means connected to said compressors and to said separate members and actuated by relative lateral movement by the said members for operating said air compressors and connections from said air compressors to said air storage tanks.

6. In an ocean swell motor, a pair of separate buoyant members, one member entirely surrounding the other, the inner buoyant member including a plurality of separate tanks, a mast structure surrounding said tanks, air cushions arranged in the upper portion of said mast structure, connections between the outer buoyant member and said air cushions, compressed air storage carried by said members, air compressors arranged on one of said members, means connected to said compressors and to said separate members and actuated by relative lateral movement by the said members for operating said air compressors, connections from said air compressors to said air storage tanks and means for yieldingly resisting and limiting the lateral movement between said separate members.

7. In an ocean swell motor, a pair of separate buoyant members, one arranged within the other, the inner buoyant member including a plurality of separate tanks, a mast structure surrounding said tanks, air cushions arranged in the upper portion of said mast structure, connections between the outer buoyant member and said air cushions, compressed air storage tanks arranged on said members, air compressors carried by said members, connections between said members and air compressors whereby relative movement between said members is utilized for actuating said air compressors and connections from said air compressors to said compressed air storage tanks.

8. In an ocean swell motor, a pair of separate buoyant members, one arranged within the other, the inner buoyant member including a plurality of separate tanks, a mast structure surrounding said tanks, air cushions arranged in the upper portion of said mast structure, connections between the outer buoyant member and said air cushions, compressed air storage tanks arranged on said members, air compressors carried by said members, connections between said members and air compressors whereby relative movement between said members is utilized for actuating said air compressors, connections from said air compressors to said compressed air storage tanks and means for yieldingly resisting and limiting the relative movement between said buoyant members.

9. In an ocean swell motor, a pair of separate buoyant members, one arranged within the other, the inner buoyant member including a plurality of separate tanks, a mast structure surrounding said tanks, air cushions arranged in the upper portion of said mast structure, connections between the outer buoyant member and said air cushions, compressed air storage tanks arranged on said members, air compressors carried by said members, connections between said members and air compressors whereby relative movement between said members is utilized for actuating said air compressors, and connections from said air compressors to said compressed air storage tanks.

10. In an ocean swell motor, a pair of separate buoyant members, one of which entirely surrounds the other, the inner buoyant member including a plurality of separate tanks, a mast structure surrounding said tanks, air cushions carried by said mast structure, compressed air storage tanks on said members, air compressors arranged on said members, connections between said air compressors and said storage tanks, cables having their lower ends connected to the inner one of said buoyant members and operatively connected to said air compressors, and the upper ends of which cables are connected to the air cushions on said mast structure.

11. In an ocean swell motor, a pair of separate buoyant members, one of which entirely surrounds the other, the inner buoyant member including a plurality of separate tanks, a mast structure surrounding said tanks, air cushions carried by said mast structure, compressed air storage tanks on said members, air compressors arranged on said members, connections between said air compressors and said storage tanks, cables having their lower ends connected to the inner one of said buoyant members and operatively connected to said air compressors and the upper ends of which cables are connected to the air cushion on said mast structure and means for maintaining said cables in taut condition.

12. In an ocean swell motor, a pair of separate buoyant members, one of which entirely surrounds the other, the inner buoyant member including a plurality of separae tanks, a mast structure surrounding said tanks, air cushions carried by said mast structure, compressed air storage tanks on said members, air compressors arranged on said members, connected between said air compressors and said storage tanks, cables having their lower ends connected to the inner one of said buoyant members and operatively connected to said air compressors, the upper ends of said cables being connected to the air cushions on said mast structure, means for maintaining said cables in taut condition and means for yieldingly resisting and limiting relative movement between said buoyant members.

13. In an ocean swell motor, a pair of separate buoyant members, compressed air storage tanks carried by said buoyant members, air compressors arranged between said members, connections between said air compressors and said members whereby said compressors are actuated as a result of relatively vertical movement between said members, connections from said air compressors to said air storage tanks, a second set of air compressors arranged on one of the buoyant members, connections between said second set of air compressors and the other one of said buoyant members for actuating said second set of air compressors and connections from said last mentioned air compressors to said compressed air storage tanks.

14. In an ocean swell motor, a pair of separate buoyant members, compressed air storage tanks carried by said buoyant members, air compressors arranged between said members, connections between said air compressors and said members whereby said compressors are actuated as a result of relatively vertical movement between said members, connections from said air compressors to said air storage tanks, a second set of air compressors arranged on one of the buoyant members, connections between said second set of air compressors and the other one of said buoyant members for actuating said second set of air compressors, connections from said last mentioned air compressors to said compressed air storage tanks and air cushioning means for yieldingly resisting relative vertical and lateral movement between said members.

15. In an ocean swell motor, a pair of separate buoyont members, one of which entirely surrounds the other, the inner one of said members, including a plurality of separate tanks, a mast structure supported by said tanks, air cushions on the upper portion of said mast structure, compressed air storage tanks carried by said buoyant members, air compressors arranged between said members, connections between said air compressors and said members whereby said compressors are actuated as a result of relatively vertical movement between said members, connections from said air compressors to said air storage tanks, a second set of air compressors arranged on one of the buoyant members, connections between said second set of air compressors and the other one of said buoyant members for actuating said second set of air compressors, connections from said last mentioned air compressors to said compressed air storage tanks, air cushioning means for yieldingly resisting relative lateral movement between said members, and cables having their lower ends connected to the inner one of the buoyant members, the upper ends of which cables are connected to the air cushions on the mast structure.

16. In an ocean swell motor, a pair of independent buoyant members, one surrounding the other, each member being substantially triangular in shape in horizontal section with the corners of the inner member disposed between the corners of the outer member, a relatively large tank arranged at each corner of the outer buoyant member, a plurality of air storage tanks arranged within each large corner tank, air compressors connected to said air storage tanks, a superstructure supported upon the large corner tanks of the outer member, a mast structure supported by and surmounting the inner one of said buoyant members and connections between the inner buoyant member and its mast structure and said air compressors for operating the latter upon relative movement between the inner and outer buoyant members.

17. In an ocean swell motor, a pair of independent buoyant members, one surrounding the other, each member being substantially triangular in shape in horizontal section, with the corners of the inner member disposed between the corners of the outer member, a relatively large tank arranged at each corner of the outer buoyant member, a plurality of air storage tanks arranged within each large corner tank, air compressors connected to said air storage tanks, a superstructure supported upon the large corner tanks of the outer member, a mast structure supported by and surmounting the inner one of said buoyant members and connections between the inner buoyant member and its mast structure and said air compressors for operating the latter upon relative movement between the inner and outer buoyant members and means for cushioning and limiting the movement of the two members toward and away from each other.

18. In an ocean swell motor, a pair of independent buoyant members, one surrounding the other, each member being substantially triangular in shape in horizontal section, with the corners of the inner member disposed between the corners of the outer member, a relatively large tank arranged at each corner of the outer buoyant member, a plurality of air storage tanks arranged within each large corner tank, a super-structure supported upon the large corner tanks of the outer member, a mast structure supported by and surrounding the inner one of said buoyant members, cushioning means carried by the upper portion of the mast structure, cushioning means between the inner one of the buoyant members and the superstructure of the outer member, cushioning means between the two buoyant members and means arranged on said members for converting the relative movement between the two members into power.

19. In an ocean swell motor, a pair of independent buoyant members, one surrounding the other, each member being substantially triangular in shape in horizontal section, with the corners of the inner member disposed between the corners of the outer member, a relatively large tank arranged at each corner of the outer buoyant member, a plurality of air storage tanks arranged within each large corner tank, a super-structure supported upon the large corner tanks of the outer member, a mast structure supported by and surrounding the inner one of said buoyant members, means arranged in the upper portion of the mast structure and between the inner one of the buoyant members and the superstructure of the outer member for cushioning and limiting the movement of the two members toward and away from each other and means arranged on said members for converting the relative movement between the two members into power.

20. In an ocean swell motor, a pair of independent buoyant members, one surrounded by the other, air compressors on said members, connections between said members and air compressors whereby the latter are actuated as a result of relative movement between said independent members, a mast structure projecting upwardly from the inner buoyant member, air cushions on the upper portion of said mast structure, flexible connections between the outer one of the buoyant members and the lower portion of said inner buoyant member and said air cushions and means on the mast structure for regulating the resistance offered by said air cushions.

In testimony whereof I affix my signature.

ROBERT A. BROWN.